United States Patent
Caretti et al.

(10) Patent No.: US 11,153,890 B2
(45) Date of Patent: Oct. 19, 2021

(54) METHOD AND SYSTEM FOR MANAGING UE-TO-UE INTERFERENCE IN A MOBILE TELECOMMUNICATION NETWORK

(71) Applicant: TELECOM ITALIA S.p.A., Milan (IT)

(72) Inventors: Marco Caretti, Turin (IT); Gian Michele Dell'Aera, Turin (IT); Maurizio Fodrini, Turin (IT); Bruno Melis, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 24 days.

(21) Appl. No.: 16/625,942

(22) PCT Filed: Jul. 16, 2018

(86) PCT No.: PCT/EP2018/069277
§ 371 (c)(1),
(2) Date: Dec. 23, 2019

(87) PCT Pub. No.: WO2019/016141
PCT Pub. Date: Jan. 24, 2019

(65) Prior Publication Data
US 2020/0178267 A1    Jun. 4, 2020

(30) Foreign Application Priority Data

Jul. 21, 2017   (IT) .................. 102017000083557

(51) Int. Cl.
H04W 72/12      (2009.01)
H04W 76/11      (2018.01)
(Continued)

(52) U.S. Cl.
CPC ............. *H04W 72/121* (2013.01); *H04L 5/14* (2013.01); *H04W 8/005* (2013.01); *H04W 72/082* (2013.01); *H04W 76/11* (2018.02)

(58) Field of Classification Search
None
See application file for complete search history.

(56) References Cited

U.S. PATENT DOCUMENTS 8,488,561 B2 *  7/2013  Uemura ............ H04W 52/0206
                                                      370/332
9,559,798 B2 *  1/2017  Nuss ................. H04W 36/0061
(Continued)

FOREIGN PATENT DOCUMENTS

| EP | 2 858 398 A1 | 4/2015 |
| EP | 2 930 982 A1 | 10/2015 |
| WO | WO 2017/097016 A1 | 6/2017 |

OTHER PUBLICATIONS

International Search Report and Written Opinion dated Aug. 27, 2018 in PCT/EP2018/069277 filed on Jul. 16, 2018.

*Primary Examiner* — Bunjob Jaroenchonwanit
(74) *Attorney, Agent, or Firm* — Oblon, McClelland, Maier & Neustadt, L.L.P.

(57) ABSTRACT

A method for managing a full duplex mobile telecommunication network includes providing a coordination unit of a set of base stations, and having the coordination unit group a plurality of user equipment served by said base stations to form corresponding user groups. Each user group includes a group of user equipment which are close to each other by an extent such to cause potential user equipment to user equipment interference. The method also includes having the coordination unit allocate radio resources for at least one between transmissions from user equipment to base stations, and transmissions from base stations to user equipment. The method further includes having each base station carrying (Continued)

out at least receiving transmissions from at least one served user equipment, and sending transmissions to at least one served user equipment by exploiting the allocated radio resources.

11 Claims, 3 Drawing Sheets

(51) Int. Cl.
*H04L 5/14* (2006.01)
*H04W 8/00* (2009.01)
*H04W 72/08* (2009.01)

(56) References Cited

U.S. PATENT DOCUMENTS

| | | | |
|---|---|---|---|
| 2015/0049624 A1* | 2/2015 | Sun | H04W 24/08 370/252 |
| 2015/0085805 A1* | 3/2015 | Li | H04W 72/044 370/329 |
| 2017/0033881 A1 | 2/2017 | Wu et al. | |
| 2017/0034790 A1 | 2/2017 | Lopez-Perez et al. | |
| 2018/0184319 A1* | 6/2018 | Fong | H04L 43/16 |
| 2019/0116507 A1* | 4/2019 | Bizzarri | H04W 36/08 |

* cited by examiner

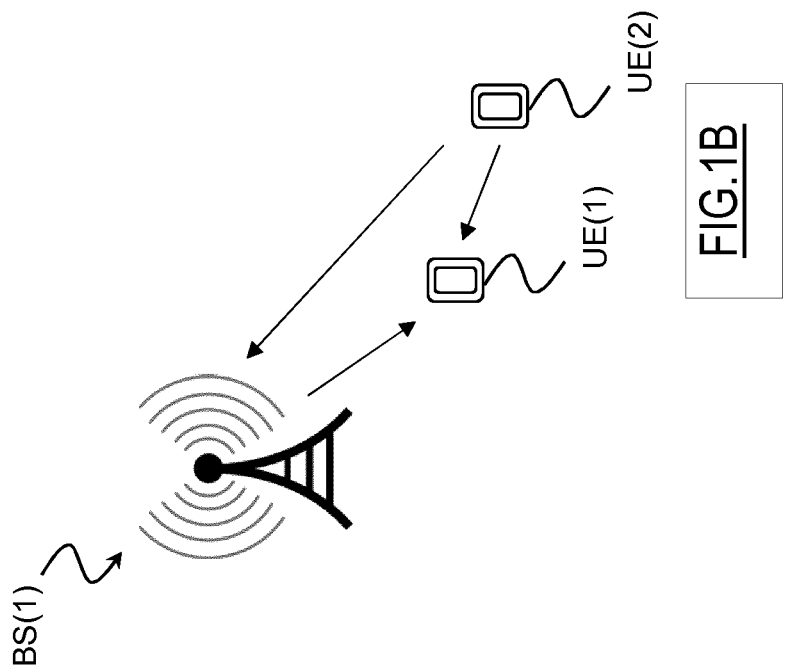
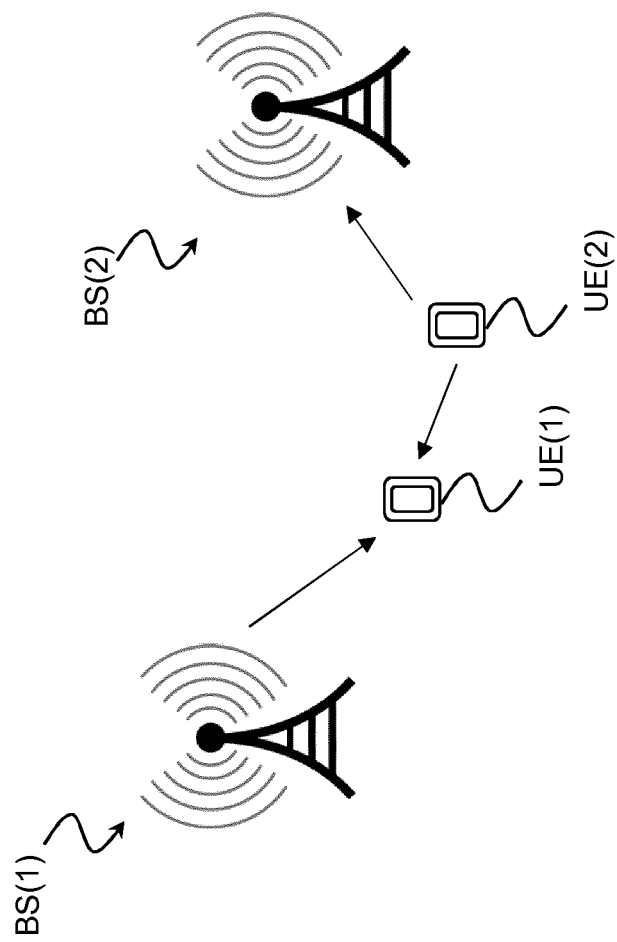

METHOD AND SYSTEM FOR MANAGING UE-TO-UE INTERFERENCE IN A MOBILE TELECOMMUNICATION NETWORK

BACKGROUND OF THE INVENTION

Field of the Invention

The present invention generally relates to the telecommunications field. More particularly, the present invention relates to the management of user-to-user interference in a full duplex telecommunication network, such as a full duplex mobile telecommunication network.

Overview of the Related Art

In already known networks it is generally very difficult to transmit and receive at the same time on the same frequencies because the act of transmission creates a massive amount of interference for the receiver, preventing the receiver from detecting the desired signal coming from the other end of the wireless link. This is the reason why in previous network technologies, such as in 4G mobile networks, the uplink transmission from User Equipment (UE) to the network infrastructure nodes (base stations, such as Evolved NodeB, "eNodeB") and the downlink transmission from eNodeB to UE are separated in time according to a Time Division Duplex (TDD) modality or are separated in frequency using a Frequency Division Duplex (FDD) modality.

A recent new transmission technology denoted as "Full Duplex Transmission" and described in the document "*Applications of Self-Interference Cancellation in 5G and Beyond*" by S. Hong et al, Kumu Networks and Stanford University, IEEE Communications Magazine, February 2014 has been developed, according to which a network node (e.g., an eNodeB) is able to transmit a signal (e.g., to a UE) and simultaneously receive signals (e.g. from other radio sources, like a different UE) using the same radio resources (e.g., in the same frequency band) exploiting a Full Duplex (FD) transmission.

The FD transmission technology exploits a self-interference cancellation technique. This technique is based on the idea that since a node already knows the signal it has to transmit in downlink, the same node can exploit this information to remove the self-interference originated by such transmitted signal to correctly receive uplink transmissions coming from UE. Since the downlink signal which can generate self-interference is locally generated at the node, the power of the uplink signals coming from UE and received by such node has several dBs of attenuation with respect to the self-interference that has to be removed. The FD technology makes the simultaneous uplink and downlink communication between UEs and an eNodeB possible on the same band, however some interference problems still arise by considering that usually multiple FD connections may occur in the same or in adjacent cells.

Hereinafter, by "adjacent cells" it is intended in general cells whose base stations are affected by mutual interference. Said base stations belonging to adjacent cells are referred to as "adjacent base stations".

In a mobile telecommunication network exploiting the FD technology (hereinafter, briefly referred to as "mobile FD network" or simply "FD network") a critical issue regards how to manage the interference generated by an uplink transmission carried out by a first UE which is making interference over a downlink transmission received by a second UE exploiting the same radio resources.

Indeed, such kind of interference cannot be cancelled using the abovementioned self-interference cancellation technique since it is not caused by the serving cell itself (and therefore, it is not known to the latter).

In order to show how this issue negatively influences the operation of a FD network, reference is now made to FIGS. 1A and 1B.

FIG. 1A illustrates two base stations (e.g., eNodeBs) of a FD network, namely a first base station BS(1) and a second base station BS(2), wherein the first base station BS(1) is carrying out a downlink transmission toward a served first UE UE(1), and a second UE UE(2) served by the second base station BS(2) is carrying out an uplink transmission toward the second base station BS(2). If the first UE UE(1) and the second UE UE(2) are sufficiently close to each other, and the radio resources used by the first base station BS(1) for the downlink transmission are the same used by the second UE UE(2) for the uplink transmission, said uplink transmission carried out by the second UE UE(2) interferes with the downlink transmission received by the first UE UE(1). The closer the two UEs, the higher the power of the interfering uplink transmission received by the first UE UE(1). Since in this case the entity (aggressor) causing the interference (i.e., the second UE UE(2)) belongs to the cell covered by the second base station BS(2), and the entity (victim) which experiences said interference (the first UE UE(1)) belongs to a different cell, namely the cell covered by the first base station BS(1), the case illustrated in FIG. 1A relates to an interference of the inter-cell type.

In the case illustrated in FIG. 1B both the first and second UEs UE(1), UE(2) are served by the same first base station BS(1), wherein the first UE UE(1) is receiving a downlink transmission from the first base station BS(1), and the second UE UE(2) is carrying out an uplink transmission toward the first base station BS(1). If the first UE UE(1) and the second UE UE(2) are sufficiently close to each other, and the radio resources used by the first base station BS(1) for the downlink transmission are the same used by the second UE UE(2) for the uplink transmission, said uplink transmission carried out by the second UE UE(2) interferes with the downlink transmission received by the first UE UE(1). The closer the two UEs, the higher the power of the interfering uplink transmission received by the first UE UE(1). Since in this case both the aggressor (i.e., the second UE UE(2)) and the victim (i.e., the first UE UE(1)) belong to a same cell, namely the cell covered by the first base station BS(1), the case illustrated in FIG. 1B relates to an interference of the intra-cell type.

In both cases illustrated above, both the aggressor causing interference and the victim of the interference caused by the aggressors are UEs; therefore, such kind of interference will be hereinafter referred to as UE-to-UE interference.

Patent application WO 2015/077963 A1 discloses methods for handling uplink-to-downlink interference between a first UE served by a first base station and a second UE served by a second base station. The first base station and the second base station are with full-duplex mode. The first base station receives from the first UE information about a first received signal quality associated with the first base station and a second received signal quality associated with the second base station. The first base station generates a full-duplex interference list associated with the second base station by putting the first UE into the full-duplex interference list if a difference between the first received signal quality and the second received signal quality is smaller than a threshold. This patent application is also aimed towards methods for scheduling downlink reception and methods for scheduling uplink transmission.

U.S. Pat. No. 8,913,528 discloses a method and an apparatus for handling full-duplex interference. One method includes: obtaining an interference degree that is caused when a site device performs full-duplex transmission with at least two UEs; and determining, according to the interference degree, a UE allowed to transmit uplink and downlink signals on the same time and frequency resource among the at least two UEs. In embodiments of the present invention, a UE allowed to transmit uplink and downlink signals on the same time and frequency resource may be classified according to an interference degree that is caused when a site device performs full-duplex transmission with at least two UEs, thereby preventing the interference problem in the scenario of point-to-multipoint full-duplex communication as much as possible.

SUMMARY OF THE INVENTION

The Applicant has found that FD telecommunication networks disclosed in the abovementioned prior documents are subject to strong performance degradation because of interference on downlink reception by a UE caused by interfering uplink transmissions generated by another UE close to the former UE.

In view of the above, the Applicant has faced the problem of how to manage a mobile FD network for handling interference on downlink reception by a UE caused by interfering uplink transmissions generated by another UE close to the former UE.

In very general terms, the Applicant has found that if UEs which are close to each other (and thus potentially interfering) are identified and grouped into corresponding user groups, the radio resource allocation may be advantageously carried out by:

allocating same or different radio resources (i.e., allowing the allocation of same radio resources) for concurrent downlink transmissions and uplink transmissions if such transmissions involve UEs belonging to different user groups, and providing for the allocation of different radio resources for concurrent downlink transmissions and uplink transmissions if such transmissions involve UEs belonging to a same user group.

An aspect of the present invention relates to a method for managing a full duplex mobile telecommunication network.

According to an embodiment of the present invention, the method provides for providing a coordination unit of a set of base stations.

According to an embodiment of the present invention, said coordination unit groups a plurality of user equipment served by said base stations to form corresponding user groups.

According to an embodiment of the present invention, each user group comprises a group of user equipment which are close to each other by an extent such to cause potential user equipment to user equipment interference.

According to an embodiment of the present invention, the coordination unit allocates radio resources for at least one between:

uplink transmissions from user equipment to base stations, and downlink transmissions from base stations to user equipment, by:

allocating same radio resources or different radio resources for concurrent downlink transmissions and uplink transmissions if said downlink transmissions and uplink transmissions involve user equipment belonging to different user groups, and allocating different radio resources for concurrent downlink transmission and uplink transmissions if said downlink transmissions and uplink transmissions involve user equipment belonging to a same user group.

According to an embodiment of the present invention, each base station carries out at least one between:

receiving uplink transmissions from at least one served user equipment, and sending downlink transmissions to at least one served user equipment, by exploiting said allocated radio resources.

According to an embodiment of the present invention, each user equipment generates and communicates to the coordination unit a corresponding proximity list listing other user equipment which are assessed to be close to said user equipment by an extent such to cause potential user equipment to user equipment interference.

According to an embodiment of the present invention, the coordination unit groups user equipment served by said base stations to form corresponding user groups by exploiting said proximity lists.

According to an embodiment of the present invention, the user equipment of said plurality periodically transmit respective discovery signals each one comprising an identifier of said transmitting user equipment.

According to an embodiment of the present invention, each user equipment generates a corresponding proximity list by listing in said proximity list those user equipment identified by identifiers comprised in discovery signals received by said each user equipment.

According to an embodiment of the present invention, the coordination unit sets the power level of the discovery signals to be transmitted by the user equipment of the plurality in such a way that when a first user equipment is able to receive a discovery signal from a second user equipment, such second user equipment is sufficiently close to the first user equipment to cause potential user equipment to user equipment interference.

According to an embodiment of the present invention, the method further comprises assigning to each group a corresponding scheduler process module.

According to an embodiment of the present invention, the coordination unit orders the user groups in a sequence according to a priority order based on uplink/downlink traffic and user equipment channel quality, and, starting from the user group of the sequence having the highest priority, performing the following operations for each user group:

the scheduler process module corresponding to said user group allocates radio resources for transmission to/from the user equipment of said user group by handling separately the downlink transmissions toward the user equipment of the user group and the uplink transmissions from the user equipment of the user group in such a way that the radio resources allocated for the downlink transmissions are different in space/time/frequency with respect to the radio resources allocated for the uplink transmissions.

According to an embodiment of the present invention, once the radio resource allocation for a user group has been completed, the method further comprises sending information about said radio resource allocation to the scheduler process module corresponding to the next user group in the sequence.

According to an embodiment of the present invention, if a user equipment is comprised in two or more different user groups, the method further comprises, once the scheduler process module corresponding to one of said different user groups comprising said user equipment allocates radio resources to said user equipment, removing said user equipment from the other different user groups.

According to an embodiment of the present invention, the method further comprises:
- periodically updating the user groups every a first reiteration period, and
- periodically repeating said ordering the user groups in a sequence and allocating radio resources to each user group of the sequence every a second reiteration period.

Another aspect of the present invention relates to a full duplex mobile telecommunication network. The full duplex mobile telecommunication network comprises a set of base stations and a coordination unit of said set of base stations.

According to an embodiment of the present invention, the coordination unit comprises:
- a module for grouping a plurality of user equipment served by said base stations to form corresponding user groups, each user group comprising a group of user equipment which are close to each other by an extent such to cause potential user equipment to user equipment interference;
- a module for allocating radio resources for at least one between:
  - uplink transmissions from user equipment to base stations, and
  - downlink transmissions from base stations to user equipment,
  by:
  - allocating same radio resources or different radio resources for concurrent downlink transmissions and uplink transmissions if said downlink transmissions and uplink transmissions involve user equipment belonging to different user groups, and
  - allocating different radio resources for concurrent downlink transmission and uplink transmissions if said downlink transmissions and uplink transmissions involve user equipment belonging to a same user group, each base station comprising a module for carrying out at least one between:
- receiving uplink transmissions from at least one served user equipment, and
- sending downlink transmissions to at least one served user equipment, by exploiting said allocated radio resources.

According to an embodiment of the present invention:
- each user equipment is configured to generate and communicate to the coordination unit a corresponding proximity list listing other user equipment which are assessed to be close to said user equipment by an extent such to cause potential user equipment to user equipment interference;
- the coordination unit is configured to carry out said grouping by exploiting said proximity lists.

According to an embodiment of the present invention:
- the user equipment of said plurality are configured to periodically transmit respective discovery signals each one comprising an identifier of said the transmitting user equipment, and
- each user equipment is configured to generate the corresponding proximity list by listing in said proximity list those user equipment identified by identifiers comprised in discovery signals received by said each user equipment.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIGS. 1A and 1B illustrate a portion of an exemplificative FD communication network wherein the concepts of the present invention may be applied;

DETAILED DESCRIPTION

In the following of the present description, the invention will be described using terminology compliant with 4G LTE/LTE-A systems. However, the concepts of the present invention can be applied to other wireless communication systems, such as for example the ones compliant with the 5G communication systems. In this case, the used terminology may change, even though the function of specific network elements may remain the same.

In very general terms, the solution according to an embodiment of the present invention relates to a procedure for managing UE-to-UE interference in a FD network, which provides for identifying UEs which are close to each other (and thus potentially interfering) and for grouping them into corresponding user groups, in such a way that each user group comprises UEs which are close to each other by an extent such to cause potential UE-to-UE interference, and allocating the resources in the following way:
- allocating same or different radio resources (i.e., allowing the allocation of same radio resources) for concurrent downlink transmissions and uplink transmissions if such transmissions involve UEs belonging to different user groups, and
- providing for the allocation of different radio resources for concurrent downlink transmissions and uplink transmissions if such transmissions involve UEs belonging to a same user group.

In other words, according to an embodiment of the present invention, while in general a same radio resource can be allocated in a FD way for simultaneous downlink and uplink transmissions, such FD allocation is subjected to an exception in case such simultaneous downlink and uplink transmissions involves UEs belonging to a same user group. In this latter case, instead of using a FD allocation, different radio resources are allocated for the downlink and uplink transmissions, as in the networks based on the standard half duplex radio resource allocation.

Figure 2B:
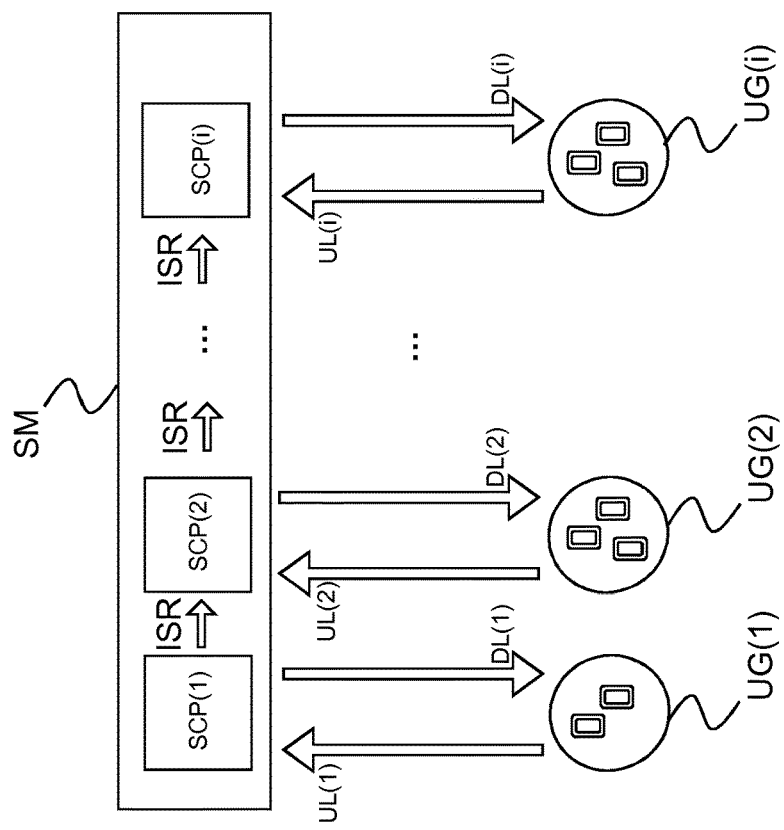
FIG. 2B shows a scheduling module SM at a coordination unit of the FD network of FIG. 2A.
Figure 2A:
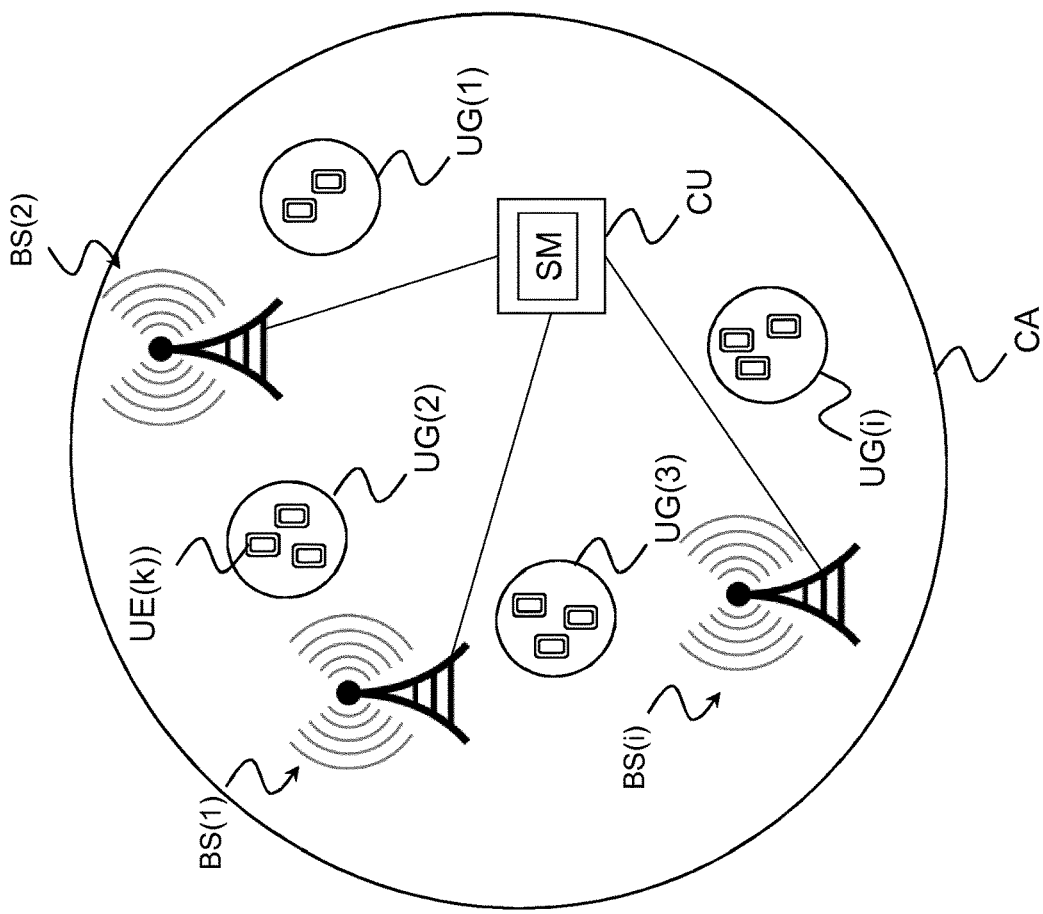
FIG. 2A schematically illustrates a portion of a FD network according to an embodiment of the present invention.

Making reference to the figures, FIG. 2A schematically illustrates a portion of a FD network according to an embodiment of the present invention.

A coordination unit CU, such as a network resource manager is connected to a corresponding set of base stations BS(j) (j=1, 2, . . . ) for the management thereof. The area corresponding to the cells covered by such base stations BS(j) defines a corresponding coordination area CA of the FD network.

As will be described in greater details in the following of the present description, the UEs UE(k) (k=1, 2, . . . ) served by the base stations BS(j) belonging to the coordination area CA are grouped in user groups UG(i) (i=1, 2, . . . ), wherein each user group UG(i) comprises UEs UE(k) which are close to each other by an extent such to cause potential UE-to-UE interference if same resources are allocated for simultaneous downlink and uplink transmissions.

According to an embodiment of the present invention the allocation of radio resources for downlink and uplink transmissions toward/from UEs UE(k) (k=1, 2, . . . ) served by the base stations BS(j) belonging to the coordination area CA is carried out by a scheduling module SM at or associated with the coordination unit CU.

Making reference to FIG. 2B, the scheduling module SM is arranged to comprise for each user group UG(i) a corresponding scheduler process module SCP(i) configured to allocate radio resources for the downlink and uplink transmissions toward/from UEs UE(k) belonging to said user group UG(i).

According to an embodiment of the present invention, the radio resources allocated by a generic scheduler process module SCP(i) for the downlink transmissions DL(i) toward UEs UE(k) belonging to the corresponding user group UG(i) are different from the radio resources concurrently allocated for the uplink transmissions UL(i) from the UEs UE(k) belonging to the same user group UG(i). In other words, a scheduler process module SCP(i) cannot allocate simultaneously same resources for the downlink transmission DL(i) and for the uplink transmission UL(i) to/from two or more UEs UE(k) belonging to the same user group UG(i).

On the other hand, the radio resources allocated by a first scheduler process module SCP(i') for the downlink transmissions DL(i')/uplink transmissions UL(i') toward/from UEs UE(k) belonging to its corresponding user group UG(i') may be the same radio resources concurrently allocated by a second scheduler process module SCP(i") for the uplink transmissions UL(i")/downlink transmissions DL(i") from/toward the UEs UE(k) belonging to its corresponding user group UG(i").

In other words, thanks to the proposed solution, while for UEs UE(k) belonging to different user groups UG(i) it is possible to advantageously exploit the concurrent allocation of same radio resources offered by the FD technology—since the mutual positions of the UEs is such that UE-to-UE interferences is not dangerous—, UEs UE(k) belonging to a same user group UG(i)—whose mutual positions are such to cause potential UE-to-UE interferences—are served with a concurrent allocation of different radio resources for uplink and downlink transmissions.

In this way, it is possible to take advantage of the benefits of FD technology without incurring in UE-to-UE interferences that would strongly degrade the performances of the network.

Making reference to the example illustrated in FIG. 2B, while radio resources allocated by the scheduler process module SCP(1) for concurrently (i.e., at the same time or during at least partially overlapping times) managing the uplink transmission UL(1) and the downlink transmission DL(1) are different, a concurrent uplink transmission or downlink transmission managed by another scheduler process module, such as for example a concurrent uplink transmission UL(2) or a concurrent downlink transmission DL(2) managed by the scheduler process SCP(2) may provide for the allocation of the same radio resources allocated by the scheduler process SCP(1) for the uplink transmission UL(1) or the downlink transmission DL(1). Indeed, in this case a UE UE(k) involved in an uplink transmission UL(1) or downlink transmission DL(1) belongs to the user group UG(1), while a UE UE(k) involved in an uplink transmission UL(2) or downlink transmission DL(2) belongs to the user group UG(2). Being comprised in two different user groups UG(i), even if same radio resources are allocated, said UEs UE(k) would not be affected by UE-to-UE interference (because they are sufficiently distant from each other).

According to an embodiment of the present invention, in case a user group UG(i) comprises one or more full-duplex capable UEs UE(k), the scheduler process module SCP(i) may concurrently allocate for one of these full-duplex capable UEs UE(k) the same resources both for downlink and uplink transmission.

For example, if a user equipment UE(k) belonging to the user group UG(1) is a full-duplex capable UE, both the uplink transmission UL(1) and the downlink transmission DL(1) may be carried out by concurrently allocating same radio resources.

According to an embodiment of the present invention, the order with which radio resources are allocated to the various user groups UG(i) can exploit a Proportional Fair (PF) metric.

According to an embodiment of the present invention, information ISR on the radio resources allocated for downlink/uplink transmissions by each scheduler process module SCP(i) is shared with the other scheduler process modules SCP(i). The information ISR on the radio resources provides details about the time/frequency/space allocation of the radio resources.

It has to be noted that due to interference conditions, a UE UE(k) may belong to multiple user groups UG(i). In this case, according to an embodiment of the present invention, said UE UE(k) will be considered by the scheduler process modules SCP(i) in all the user groups UG(i) it belongs to. However, once radio resources are allocated for the first time to said UE UE(k) by one of the scheduler process modules SCP(i), said UE UE(k) is then no longer considered.

In the following of the present description it will be described in greater detail the procedure carried out by the scheduling module SM at the coordination unit CU and by the base stations BS(j) belonging to the corresponding coordination area CA for forming the user groups UG(i) and for accordingly allocating the radio resources to the UEs UE(k) belonging to said user groups UG(i).

On this regard, in the present description, elements of the FD networks referred to as nodes, units, systems and/or modules, are herein intended to comprise, but not limited to, hardware, firmware, a combination of hardware and software, software.

For example, a node, unit, system or module may be, but is not limited to being, a process running on a processor, a processor, an object, an executable, a thread of execution, a program, and/or a computing device (e.g., UE UE(k), base stations BS(j), . . . , as well as other network elements of the FD networks, such as the coordination unit CU).

In other words, a node, unit, system or module may comprise an application being executed on a computing device and/or the computing device itself.

One or more nodes, units, systems or modules may be localized on one computing device and/or distributed between two or more computing devices.

Nodes, units, systems or modules may comprise and/or interact with computer readable media having storing data according to various data structures.

The nodes, units, systems or modules may communicate by exploiting local and/or remote processes, preferably by means of electrical, electromagnetic and/or optical signals providing one or more data packets, such as data packets from one node, unit, system or module interacting with another a node, unit, system or module in a local system, in a distributed system, and/or across a radio network and/or a wired network.

Figure 3B:
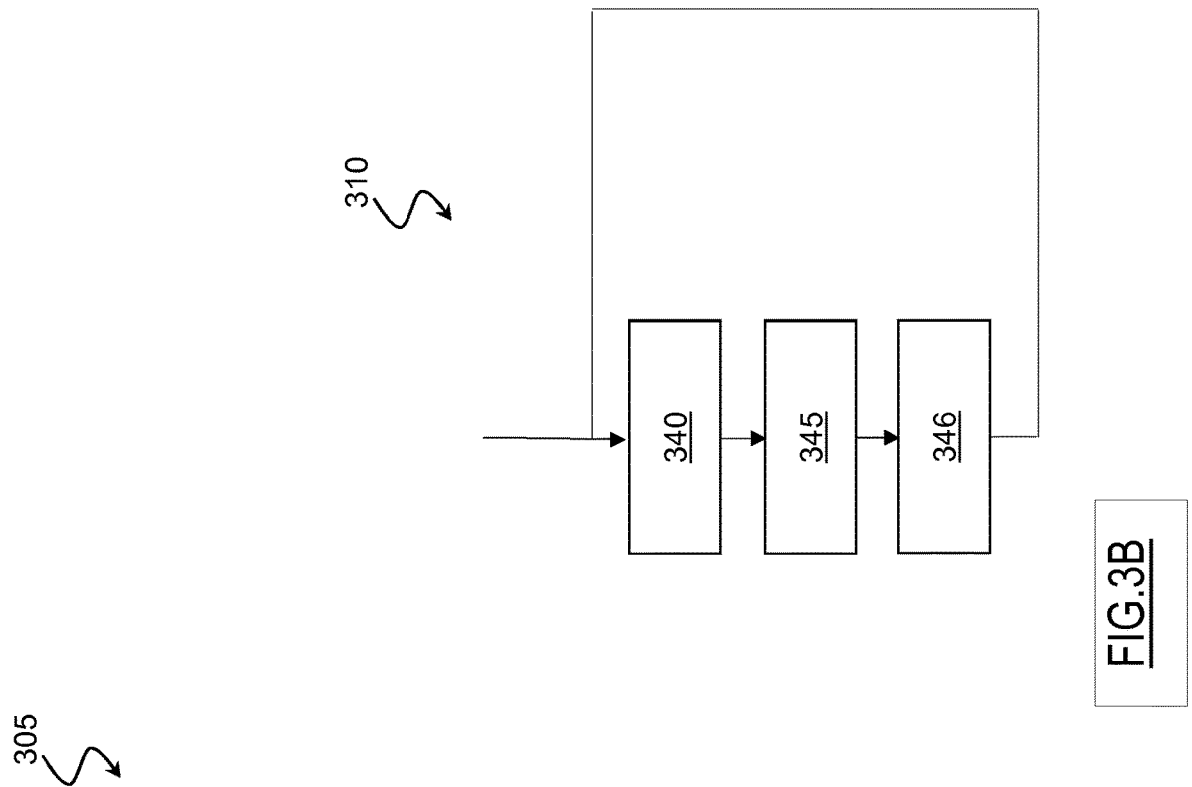
FIGS. 3A and 3B are activity flow charts illustrating the main operations of procedures carried out by the scheduling module of FIG. 2B according to an embodiment of the present invention.
Figure 3A:
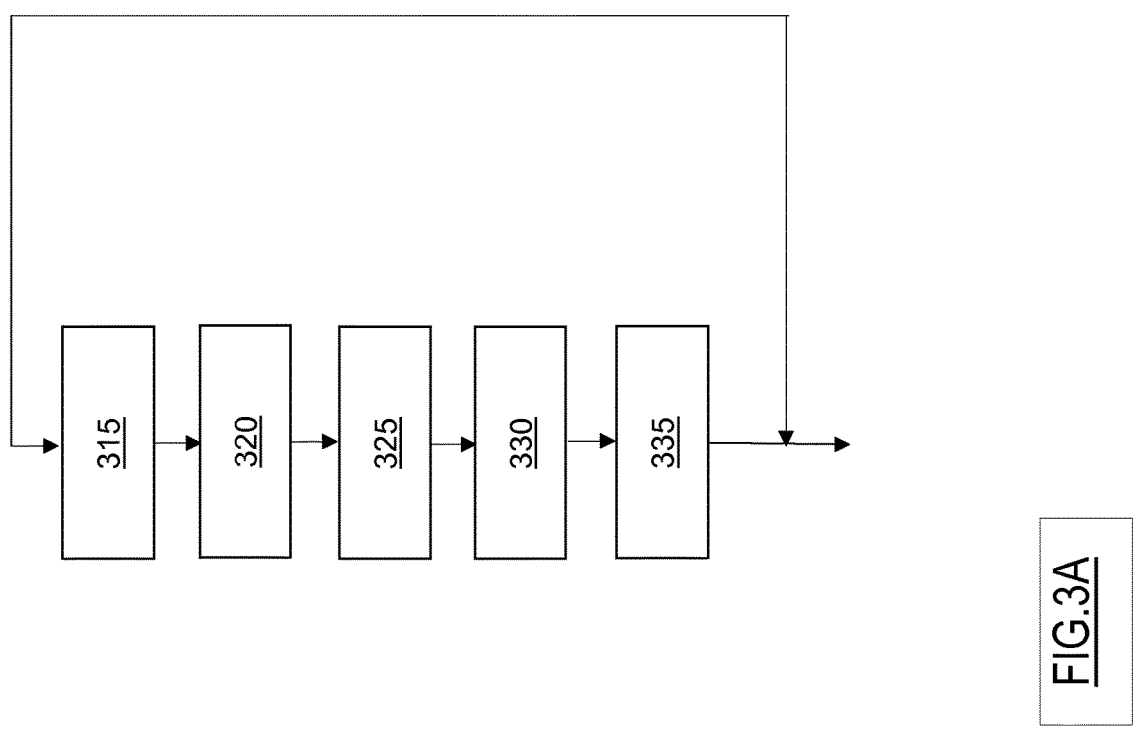

FIGS. 3A and 3B depicts activity flow charts illustrating main operations of procedures carried out by the scheduling module SM at the coordination unit CU and by the base stations BS(j) belonging to the corresponding coordination area CA according to an embodiment of the present invention.

The procedure 305 corresponding to the activity flow chart illustrated in FIG. 3A is directed to the generation and the updating of the user groups UG(i) from the UEs UE(k) belonging to the coordination area CA, while the procedure 310 corresponding to the activity flow chart illustrated in FIG. 3B is directed to the allocation of the radio resources to the UEs UE(k) belonging to said user groups UG(i). The two abovementioned procedures are generally carried out concurrently, with the output of the first procedure 305 (i.e., the user groups UG(i)) which is used as input by the second procedure. 310 As will be described in detail in the following of the present description, each one of said two procedures is reiterated at a respective repetition frequency.

The first operation of the first procedure 305 (block 315) according to an embodiment of the present invention provides that each base station BS(j) belonging to the coordination area CA assigns a corresponding Temporary Identity (TID) to each served UE UE(k). The TID univocally identifies a UE UE(k) in the CA. According to an embodiment of the present invention, a same TID may be reassigned in another CA.

In the next operation (block 320) according to an embodiment of the present invention, each UE UE(k) served by the base stations BS(j) belonging to the coordination area CA periodically transmits a discovery signal DS containing as main information the TID of the UE UE(k) itself. When a UE UE(k) is not transmitting its corresponding discovery signal DS, said UE UE(k) is set in a listening mode in order to detect possible discovering signals DS transmitted by other UEs UE(k) belonging to the coordination area CA. The transmission/reception of the discovery signal DS is carried out by exploiting specific radio resources assigned by the base stations BS(j) under the control of the coordination unit CU. The coordination unit CU is configured to control the base stations BS(j) belonging to the corresponding coordination area CA in such a way that the base stations BS(j) assign the radio resources to their corresponding served UEs UE(k) for the transmission of the discovery signals DS in a coordinated way.

Moreover, the coordination unit CU is also configured to set the power level PWL of the various discovery signals DS transmitted by the UEs UE(k) belonging to the coordination area CA. The coordination unit CU controls the base stations BS(j) in such a way that each base station BS(j) assigns orthogonal radio resources for the transmission/reception of the discovery signals DS to each served UEs ("network controlled discovery procedure"). Alternatively, a portion of the available radio resources can be reserved (in the whole coordination area CA) for the transmission of the discovery signals DS, and the UEs UE(k) are left free to transmit/receive discovery signals DS exploiting these reserved radio ("autonomous discovery procedure"). Since each discovery signal DS generated by a UE UE(k) conveys the TID identifying the UE UE(k) itself which transmitted the discovery signal DS, when a UE UE(k) receives a discovery signal DS, said UE UE(k) is capable of identifying which is the specific UE UE(k) of the coordination area CA having transmitted said received discovery signal DS.

The power level PWL of the various discovery signals DS transmitted by the UEs UE(k) belonging to the coordination area CA is set by the coordination unit CU in such a way that when a UE UE(k) is able to receive a discovery signal DS from another UE UE(k), it means that such another UE UE(k) is sufficiently close to the former UE UE(k) to cause potential UE-to-UE interference.

The power level PWL value may be advantageously set by taking into consideration the environmental scenario wherein the base stations BS(j) of the coordination area CA are deployed. For example, if the coordination area CA pertains to base stations BS(j) deployed in an urban area, wherein the number of UEs UE(k) is high, and wherein there is a high number of obstacles (e.g., buildings) capable of hindering radio wave propagation, the power level PWL may be set to a relatively low level, while if the coordination area CA pertains to base stations BS(j) deployed in a rural area, wherein there are less UEs UE(k) and there are less obstacles, the power level PWL may be set to a higher level.

The information related to the radio resources assigned for the transmission of the discovery signals DS may be also broadcasted periodically on the System Information Blocks (SIB). A predefined resource allocation based on TID (e.g., based on a look up table) can help in reducing the signaling and improving the reliability of such operation. For example inside a Coordination Area a group of resources for discovery signals DS transmission and a group of resources for discovery signals DS reception can be preliminary assigned for each TID. In this way when a UE UE(k) receives from the base station BS(j) the TID, the UE UE(k) will automatically receive also the information on the resource to be used.

In the next operation (block 325), each UE UE(k) generates a corresponding proximity list PL(k) which lists the TIDs of other UE UE(k) identified in the previous operation—i.e., the TID conveyed by the received discovery signals DS—and provides for each identified TID a value representing the quantized power of the received discovery signal DS corresponding to such TID. Since the power level PWL of the discovering signals DS is set in such a way that when a UE UE(k) is able to receive a discovery signal DS from another UE UE(k), it means that such another UE UE(k) is sufficiently close to the former UE UE(k) to cause potential UE-to-UE interference, the proximity list PL(k) generated by a generic UE UE(k) lists all the UEs UE(k) which are sufficiently close to cause potential UE-to-UE interference with said generic UE UE(k).

Then (block 330), according to an embodiment of the present invention, the coordination unit CU collects all the proximity lists PL(k) generated by the UEs UE(k) served by the base stations BS(j) belonging to the coordination area CA and arrange said UEs UE(k) in user groups UG(i) based on the information included in the received proximity lists PL(k). Each user group UG(i) is formed in such a way to include UEs UE(k) which are close to each other by an extent such to cause potential UE-to-UE interference. It has to be appreciated that generally, a UE UE(k) may belong to more than one user group UG(i). For example, if a first UE UE(1) has been assessed to be sufficiently close to a second UE UE(2) to cause potential UE-to-UE interference (in this case, the TID identifying the second UE UE(2) will be listed in the proximity list PL(1) of the first UE UE(1)), and the second UE UE(2) has been assessed to be sufficiently close to a third UE UE(3) to cause potential UE-to-UE interference (in this case, the TID identifying the third UE UE(3) will be listed in the proximity list PL(2) of the second UE UE(3)), while the first UE U(1) and the third UE UE(3) are not assessed to be sufficiently close to each other to cause potential UE-to-UE interference (in this case, the TID identifying the third UE UE(3) will be not listed in the proximity list PL(1) of the first UE UE(1), and the TID identifying the first UE UE(1) will be not listed in the proximity list PL(3) of the third UE UE(2)), the second UE UE(2) will be included in two different user groups UG(i), one based on the proximity list PL(1) and one based on the proximity list PL(3).

The last operation of the first procedure 305 (block 335) provides for assigning to each user group UG(i) a corresponding scheduler process module SCP(i).

The operations 315-335 of the first procedure 305 are periodically reiterated to periodically update the user groups UG(i). The reiteration period may be statically configured by the operator of the FD network, or dynamically configured after an evaluation of the UE mobility within the FD network area. For example, the reiteration period of the first procedure may be equal to 1-2 minutes.

In case the FD network receives new UE connection requests only from a few number of new UEs, the operations corresponding to blocks 315 to 335 can be dynamically performed only for the incoming new UEs. In this case, the operation corresponding to block 320 can be carried out only by a subset of UEs using system information transmitted by a base station BS(j). In this way, a combined periodic and on demand reporting of discovering measurement could be supported by the network.

In the first operation of the second procedure 310 (block 340) according to an embodiment of the present invention, the coordination unit CU orders the user groups UG(i) generated in the first procedure 305 according to a priority order based on uplink/downlink traffic and UE channel quality. According to an embodiment of the present invention, the priority order may be calculated using the well-known proportional fair metric or using priority user class/service/weights that are typically used by traditional scheduling algorithms when a UE is selected to transmit data.

Then (block 345), starting from the user group UG(i) having the highest priority (e.g., the first one according to the previously generated priority order), according to an embodiment of the present invention, the corresponding scheduler process module SCP(i) allocates radio resources for transmission to/from the UEs UE(k) of said user group UG(i) by handling separately the downlink transmissions DL(i) toward the UEs UE(k) of the user group UG(i) and the uplink transmissions UL(i) from the UEs UE(k) of the user group UG(i) in such a way that the resource allocated for the downlink transmissions DL(i) are different in space/time/frequency with respect to the ones allocated for the uplink transmissions UL(i). Once the radio resource allocation for the considered user group UG(i) is completed, information ISR about such allocation is then reported to the scheduler process module SCP(i) corresponding to the next user group UG(i) according to the priority order. This operations are reiterated for all the user groups UG(i), until all the UEs UE(k) are served or all the space/time/frequency radio resources are allocated. If a UE UE(k) is included in two or more different user groups UG(i), once the scheduler process module SCP(i) corresponding to one of such different user groups UG(i) comprising said UE UE(k) allocates radio resources to said UE UE(k), this UE UE(k) is removed from the other user groups UG(i).

At this point, the base stations BS(j) manage (346) uplink and/or downlink transmissions from/to the served UEs UE(k) by exploiting the radio resources according to the allocation carried out by the scheduler process module SCP(i) in block 345. In this way, each base station BS(j) receives uplink transmissions from at least one served UE UE(k) and/or sends downlink transmissions to at least one served UE UE(k), by exploiting said allocated radio resources.

The operations 340-346 of the second procedure 310 are periodically reiterated following the scheduling time supported by the FD network. The repetition period of the second procedure 310 is in general shorter than the one of the first procedure 305. For example, for a 4G compliant FD network, the repetition period may be equal to about 1 ms, while for a 5G compliant FD network, the repetition period may be shorter than 1 ms.

The scheduler process modules SCP(i) may verify if the user groups UG(i) are correctly updated by checking if the UEs UE(k) belonging to the various user groups UG(i) are still attached to the same base stations BS(j). For example, UEs UE(k) served by base stations BS(j) outside a coordination area CA can be removed from a user group UG(i) of the coordination area CA. In the same way, UEs UE(k) served by a base station BS(j) far away from the majority of the base stations BS(j) involved in the handling of a user group UG(i) can be removed from a user group UG(i) of the coordination area CA. When the scheduler process modules SCP(i) identify a possible inconsistency (between TID presence in a user group UG(i) and the TID identifying a UE UE(k) attached to a base station BS(j)) a new user group UG(i) identification can be triggered by the coordination unit CU (block 330). For example, a timer may be used to restart a new procedure with a periodicy that can decided by the network operator on the basis of cells dimension (small cells require faster update of the user group UG(i) identification, larger cells in rural area can requires slower update if the user group UG(i) identification).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in other embodiments.

The invention claimed is:

1. A full duplex mobile telecommunication network comprising a set of base stations and a coordination unit of said set of base stations, the coordination unit comprising:
a module configured to group a plurality of user equipment served by said base stations to form corresponding user groups, each user group comprising a group of user equipment which are close to each other by an extent that causes potential user equipment to user equipment interference, the group of user equipment being determined based on a power level of discovery signals transmitted by each user equipment in the group of user equipment;
a module configured radio resources for at least one of:
uplink transmissions from user equipment to base stations, and
downlink transmissions from base stations to user equipment,
by:
allocating same radio resources or different radio resources for concurrent downlink transmissions and uplink transmissions if said downlink transmissions and uplink transmissions involve user equipment belonging to different user groups, and
allocating different radio resources for concurrent downlink transmission and uplink transmissions if said downlink transmissions and uplink transmissions involve user equipment belonging to a same user group,
each base station comprising a module configured to carry out at least one of:
receiving uplink transmissions from at least one served user equipment, and
sending downlink transmissions to at least one served user equipment, by exploiting said allocated radio resources.

2. The full duplex mobile telecommunication network of claim 1, wherein:
each user equipment is configured to generate and communicate to the coordination unit a corresponding proximity list listing other user equipment which are assessed to be close to said user equipment by an extent such to cause potential user equipment to user equipment interference;
the coordination unit is configured to carry out said grouping by exploiting said proximity lists.

3. The full duplex mobile telecommunication network of claim 2, wherein:
the user equipment of said plurality are configured to periodically transmit respective discovery signals each one comprising an identifier of said the transmitting user equipment, and
each user equipment is configured to generate the corresponding proximity list by listing in said proximity list those user equipment identified by identifiers comprised in discovery signals received by said each user equipment.

4. A method for managing a full duplex mobile telecommunication network, comprising:
providing a coordination unit of a set of base stations;
configuring said coordination unit to group a plurality of user equipment served by said base stations to form corresponding user groups, each user group comprising a group of user equipment which are close to each other to cause potential user equipment to user equipment interference, the group of user equipment being determined based on a power level of discovery signals transmitted by each user equipment in the group of user equipment;
configuring the coordination unit to allocate radio resources for at least one of:
uplink transmissions from user equipment to base stations, and
downlink transmissions from base stations to user equipment,
by:
allocating same radio resources or different radio resources for concurrent downlink transmissions and uplink transmissions if said downlink transmissions and uplink transmissions involve user equipment belonging to different user groups, and
allocating different radio resources for concurrent downlink transmission and uplink transmissions if said downlink transmissions and uplink transmissions involve user equipment belonging to a same user group;
configuring each base station to carry out at least one of:
receiving uplink transmissions from at least one served user equipment, and
sending downlink transmissions to at least one served user equipment, by exploiting said allocated radio resources.

5. The method of claim 4, further comprising configuring each user equipment to generate and to communicate to the coordination unit a corresponding proximity list listing other user equipment which are assessed to be close to said user equipment by an extent such to cause potential user equipment to user equipment interference, wherein:
said grouping is carried out by the coordination unit exploiting said proximity lists.

6. The method of claim 5, further comprising:
configuring the user equipment of said plurality to periodically transmit respective discovery signals each one comprising an identifier of said the transmitting user equipment, wherein said having each user equipment generate a corresponding proximity list further comprises:
listing in said proximity list the user equipment identified by identifiers comprised in discovery signals received by said each user equipment.

7. The method of claim 6, further comprising configuring the coordination unit to set the power level of the discovery signals to be transmitted by the user equipment of the plurality of user equipment such that when a first user equipment is able to receive a discovery signal from a second user equipment, the second user equipment is sufficiently close to the first user equipment to cause potential user equipment to user equipment interference.

8. The method of claim 4, further comprising:
assigning to each group a corresponding scheduler process module;
configuring the coordination unit to order the user groups in a sequence according to a priority order based on uplink/downlink traffic and user equipment channel quality, and, starting from the user group of the sequence having the highest priority, performing for each user group:
configuring the scheduler process module corresponding to said user group to allocate radio resources for transmission to/from the user equipment of said user group by handling separately the downlink transmissions toward the user equipment of the user group and the uplink transmissions from the user equipment of the user group such that the radio resources allocated for the downlink transmissions are different in at least one of space, time, or frequency with respect to the radio resources allocated for the uplink transmissions.

9. The method of claim 8, further comprising:
once the radio resource allocation for a user group has been completed, sending information about said radio resource allocation to the scheduler process module corresponding to the next user group in the sequence.

10. The method of claim 8, wherein:
if a user equipment is comprised in two or more different user groups, the method further comprises, once the scheduler process module corresponding to one of said different user groups comprising said user equipment allocates radio resources to said user equipment, removing said user equipment from the other different user groups.

11. The method of claim 4, further comprising:
periodically updating the user groups every a first reiteration period, and
periodically repeating said ordering the user groups in a sequence and allocating radio resources to each user group of the sequence every a second reiteration period.

\* \* \* \* \*